(No Model.) 3 Sheets—Sheet 3.
T. L. HOLBROOK & C. SCHU.
BRICK DRIER.
No. 579,579. Patented Mar. 30, 1897.
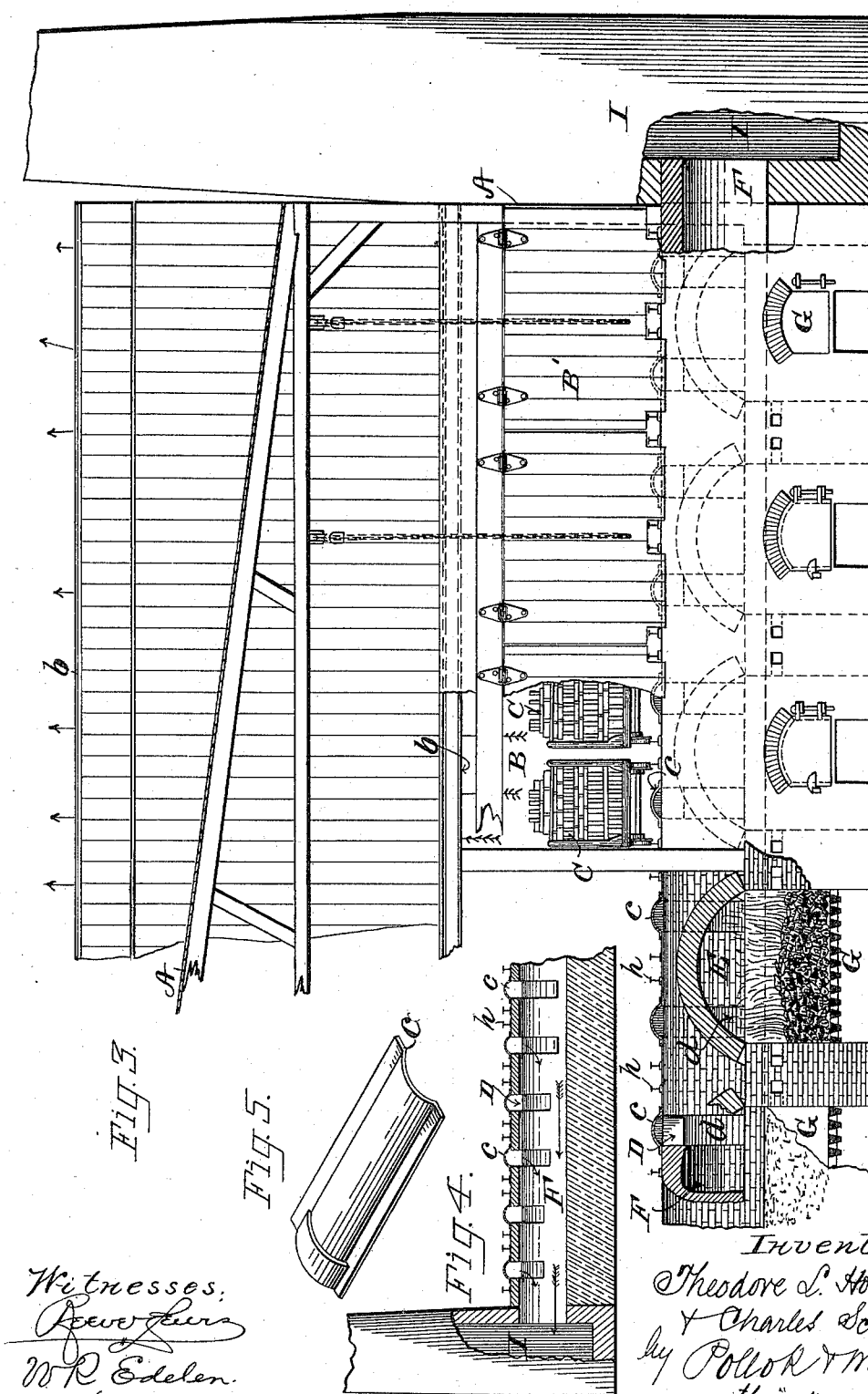

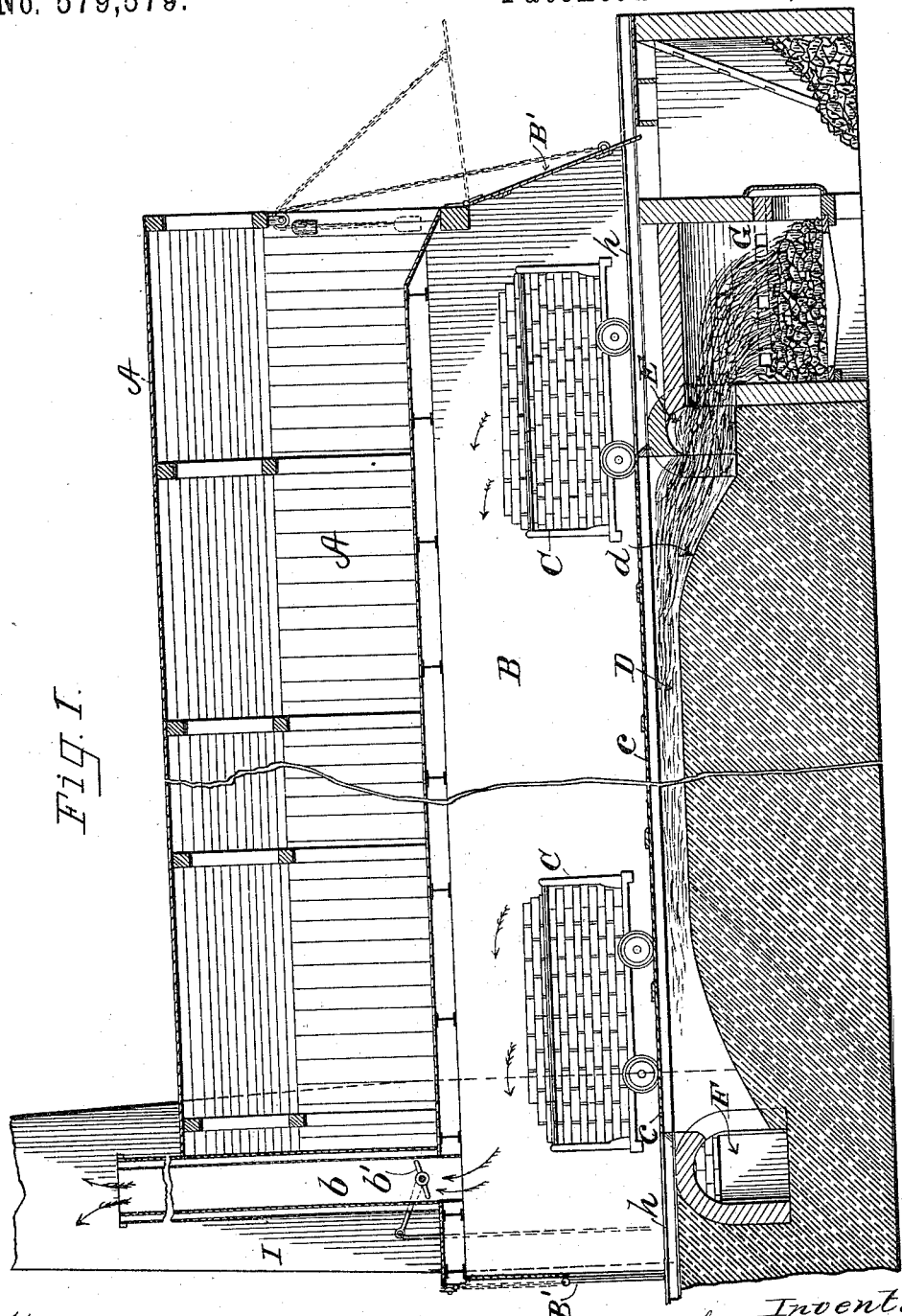

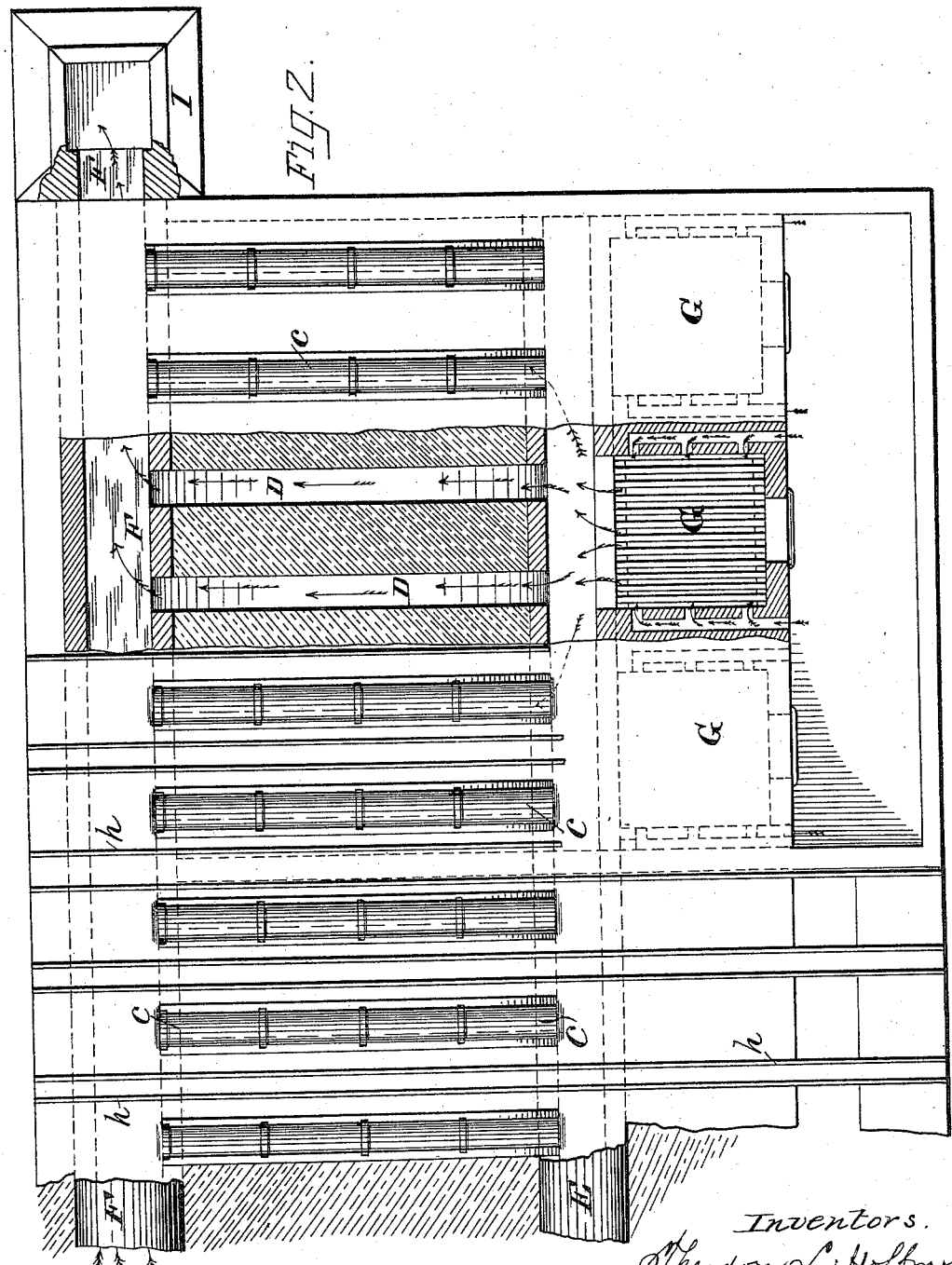

UNITED STATES PATENT OFFICE.

THEODORE L. HOLBROOK AND CHARLES SCHU, OF WASHINGTON, DISTRICT OF COLUMBIA.

BRICK-DRIER.

SPECIFICATION forming part of Letters Patent No. 579,579, dated March 30, 1897.

Application filed April 11, 1896. Serial No. 587,195. (No model.)

*To all whom it may concern:*

Be it known that we, THEODORE L. HOLBROOK and CHARLES SCHU, of Washington, District of Columbia, have invented new and useful Improvements in Brick-Driers, which are fully set forth in the following specification.

The present invention has reference to driers for bricks, but may, wholly or in part, be used for other purposes.

Ordinarily in drying bricks by the heat of a furnace or furnaces the bricks loaded upon suitable cars are run into the drying-chamber, the smoke and gases from the furnace circulating through said chamber, making contact with the bricks, and passing out through the chimney located at some central or intermediate point. In such an arrangement the deposit of soot and other refuse in the drying-chamber and upon the bricks is objectionable and is to a certain extent injurious to the bricks themselves. Brick-driers have also been constructed with pipes for the products of combustion extending through the drying-chamber. This plan is also objectionable, owing to the difficulty of getting access to the interior of the pipes for the purpose of cleaning the same. Much difficulty has also been heretofore experienced on account of a lack of uniformity of temperature in the heating-chamber, resulting in a corresponding lack of uniformity in the product and in a great loss of time. The locating of the chimney at a central or intermediate point between the ends of the apparatus also involves complexity of structure with reference to adjacent parts, greatly interferes with the compact assemblage of the car-tracks through the drying-chamber, and also entails sacrifice of valuable space within the drier. The object of locating the flue centrally was to equalize so far as possible the temperature in the drying-chamber; but this result is attained by the present invention in a structure which has the flue located at one end.

We have devised a drying apparatus which in practice realizes the following advantageous results, among others: The heating-flues are so arranged as to radiate the heat effectively into the drying-chamber and to maintain therein an approximately uniform temperature. The period of drying is shortened and a greater uniformity of product obtained. The flues, moreover, are readily accessible for purposes of cleaning, little time being lost in that operation. The arrangement also effects economy in fuel in that the heat is utilized to a greater degree than heretofore, and the system of flues is such that but a single furnace may be used, or, if desired, two or more furnaces may be put into operation, the main distributing-flue being common to a plurality of furnaces.

The structure is simplified by placing the chimney at one end of a common discharge-flue, and space is thereby utilized to the best advantage.

In a drier constructed according to our invention the products from the furnace do not pass through the drying-chamber, but are conducted through suitable flues extending beneath said chamber and inclosed by heat-radiating covers, preferably of a concavo-convex form, loosely placed in position, so that they can be readily removed for the purpose of cleaning the flues. These heating-flues are connected at one end with a distributing-flue extending horizontally at right angles thereto and communicating with the furnace or furnaces, so that one furnace is or may be utilized to feed a number of the heating-flues, thereby effecting a considerable saving in fuel. The heating-flues are enlarged at their ends opening into the distributing-flue and having upwardly curved or inclined bottoms, whereby the flames and gases are deflected upwardly against the covers to more efficiently heat the same. At their exit ends the heating-flues are led into a discharge-flue. In order that there may be an equalization of the draft through the several flues, the openings therefrom into the discharge-flue are of different sizes, the openings increasing in size from that which is nearest the chimney to that which is the most distant therefrom. From the top of the drying-chamber and extending the entire width thereof is a passage-way or exit extending upwardly and opening into the air. Located in this exit-passage is a damper which may be adjusted to regulate the escape of steam or vapor produced by the action of the heat upon the water contained in the bricks.

Other features of the invention will be understood by reference to the accompanying drawings, forming part of this specification, wherein we have shown what is deemed the best embodiment of our invention in practical form, and wherein—

Figure 1 is a sectional elevation through a drying-chamber, furnace, &c., embodying our invention. Fig. 2 is a view, partly in plan and partly in horizontal section, showing the arrangement of the tracks, flues, &c. Fig. 3 is an elevation, partly broken away, taken from the right of Fig. 1. Fig. 4 is a detail of the cross-flue at the rear of the drier, and Fig. 5 is a detail of one of the covers for the heating-flues.

Referring to the drawings, A represents the shed or housing built over the drying-chamber B, the latter being constructed of sheet metal. Chamber B has an exit-passage *b* leading upwardly therefrom and extending the entire width of the chamber. Damper *b'* is placed in this passage and may be adjusted to permit the escape of steam or vapors from the chamber and to regulate the temperature thereof. Exit *b* is preferably located at the side of the chamber opposite that under which the furnace or furnaces are situated. In operation the damper *b'* is at first kept shut to retain as much heat as possible in the chamber, but as the air therein becomes charged with vapor the damper is opened to permit its escape.

At opposite sides of chamber B are horizontally-swung doors B', which may be opened for the entrance or exit of cars C, laden with bricks.

Upon the plan illustrated in the drawings, which show two of a series of drying-chambers arranged side by side, there are six longitudinal heating-flues D beneath each chamber, which flues, as preferably constructed, are about square in cross-section, being somewhat enlarged at their ends, where they communicate with a distributing-flue E in front and discharge-flue F at the rear of the drier, these flues extending at right angles to said heating-flues. At their enlarged ends, opening into the main distributing-flue E, the flues D have an upwardly-curved bottom *d*, whereby the flames and gases from the furnace are deflected upwardly against the covers, referred to hereinafter, to utilize more completely the heat of the furnace.

Corresponding to each drying-chamber are three furnaces G G G, one furnace for every two of the heating-flues. The heating effects of each furnace are not confined, however, to any two particular flues, as all of the furnace communicates with the common distributing-flue E, into which flues D open. As shown in the drawings, the flues E and F are common to the furnaces of all of the driers of the series. When it is desired to use only one or more of the series, so much of the distributing-flue E as corresponds therewith may be divided off by stopping up the flue with clay at proper points, so as to confine the heating effects of the furnace within the desired limits, or it may be found convenient to form the distributing-flue in separate sections, one to each drier.

As already stated, the openings of the flues C into the discharge-flue F are of varying size, as shown in Fig. 4, those farthest from the chimney being the largest, with a graduated diminution in size as they approach the chimney, the purpose of such arrangement being to equalize the draft.

The tops of the flues C are formed by metallic covers *c* of concavo-convex form, the convexity being toward the chamber, whereby the heat is radiated into the latter. These covers overlap each other at their ends and in practice are covered by a thin layer of sand closely filling in the joints. The rails *h h* for the cars C are arranged on each side of the covers, so that the cars standing thereon are directly above the flues D.

As shown in Fig. 2, the chimney I is located at the end of the building near the side thereof along which the discharge-flue E extends. It is in such position as not to interfere with laying the rails closely together and the passage of the car in at one side of the drying-chamber and out at the other.

In operation the products of combustion from the furnaces G pass through distributing-flue E and into heating-flues D, heating the covers, from which the heat is radiated into the drying-chamber.

The number of heating-flues and of furnaces employed may of course be varied within wide limits, and the invention is not restricted to the precise arrangement illustrated.

Having thus described our invention, what we claim as new, and desire to secure by Letters Patent, is—

1. In a drier for bricks, the combination with a drying-chamber, of a series of furnaces, a horizontal distributing-flue extending along one side of said chamber and with which each of the furnaces communicates, a cross-flue parallel to the distributing-flue on the opposite side of said chamber and having at one end a chimney, and a series of heating-flues extending from the distributing-flue to the cross-flue, the tops of said flues being of heat-radiating material, and separating the flues from the drying-chamber, substantially as described.

2. In a drier for bricks, the combination with the drying-chamber, of a furnace, a horizontal distributing-flue extending along one side of said chamber, a cross-flue parallel to the distributing-flue on the opposite side of said chamber and having at one end a chimney, and a series of heating-flues extending from the distributing-flue to the cross-flue, the tops of said flues being formed of concavo-convex removable metallic covers, whereby direct access can be had to the flues from the chamber, substantially as described.

3. In a drier for bricks, the combination with a drying-chamber, of a furnace, a horizontal distributing-flue extending along one side of said chamber, a cross-flue parallel to the distributing-flue on the opposite side of said chamber and having at one end a chimney, and a series of heating-flues extending from the distributing-flue to the cross-flue, the discharge-openings of the heating-flues being of different dimensions, increasing in size from that nearest the chimney to that farthest therefrom, whereby uniformity of draft and heating effect in the several flues is maintained, substantially as described.

4. In a drier for bricks, the combination with a drying-chamber having a series of tracks for the cars containing bricks to be dried, of a furnace, a distributing-flue extending along one side of said chamber transverse to the tracks, a series of heating-flues each connected with said distributing-flue and extending beneath the chamber parallel with said tracks each flue being separated from said chamber by removable heat-radiating covers, the several covers occupying the space between the tracks, substantially as described.

In testimony whereof we have signed this specification in the presence of two subscribing witnesses.

THEODORE L. HOLBROOK.
   CHARLES SCHU.

Witnesses:
 REEVE LEWIS,
 W. REES EDELEN.